E. R. MERTENS.
RADIATOR COVER.
APPLICATION FILED JAN. 25, 1919.
1,379,412. Patented May 24, 1921.
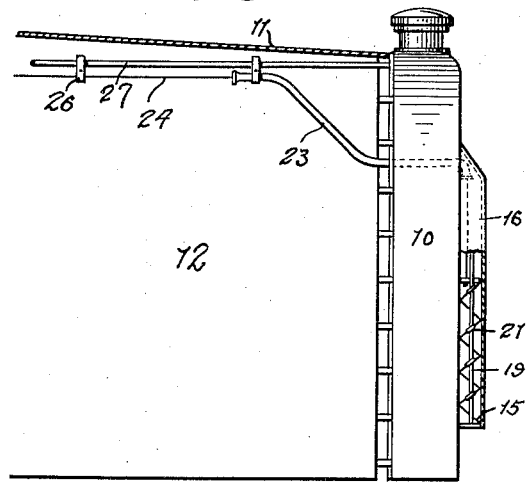
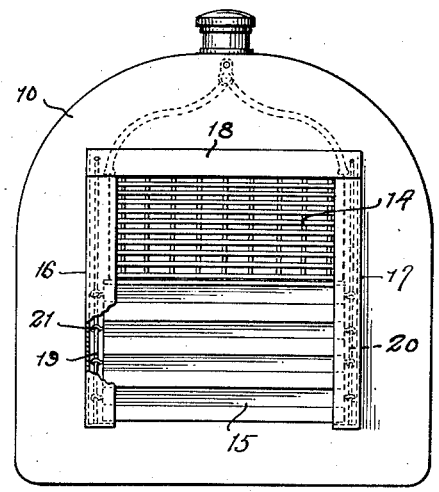
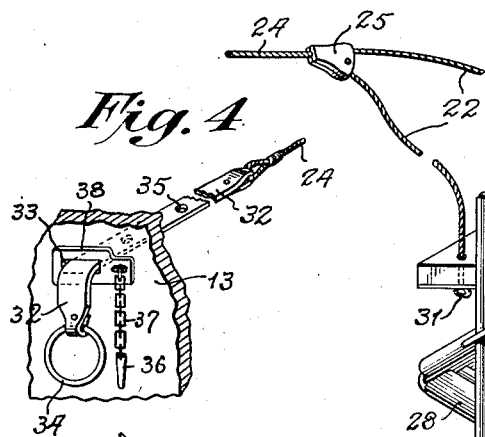
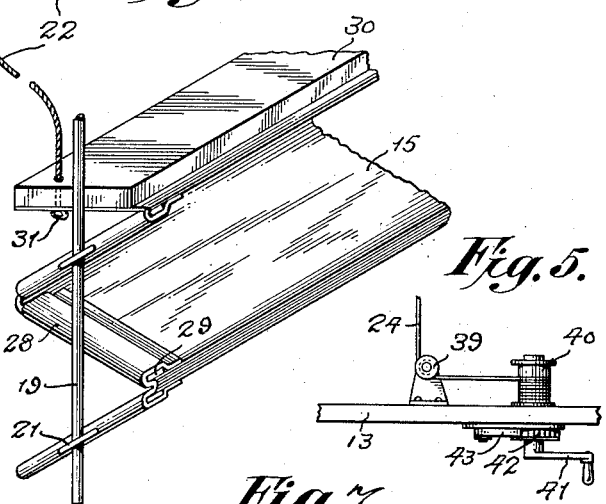
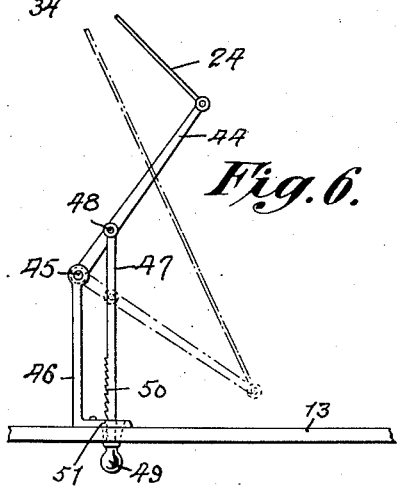
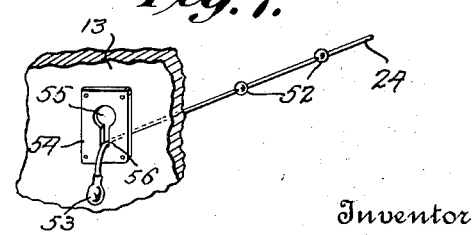
Inventor
EUGENE R. MERTENS
By his Attorneys

UNITED STATES PATENT OFFICE.

EUGENE R. MERTENS, OF NEW YORK, N. Y., ASSIGNOR TO DETROIT CADILLAC MOTOR CAR COMPANY, OF NEW YORK, N. Y., A CORPORATION OF NEW YORK.

RADIATOR-COVER.

1,379,412.   Specification of Letters Patent.   Patented May 24, 1921.

Application filed January 25, 1919. Serial No. 273,197.

*To all whom it may concern:*

Be it known that I, EUGENE R. MERTENS, a citizen of the United States of America, residing in the city, county, and State of New York, have invented certain new and useful Improvements in Radiator-Covers, of which the following is a specification.

My invention relates to radiator covers and particularly to covers for automobile radiators, the object of my invention being to provide a cover which may be adjusted to meet various temperature and engine conditions, the adjusting means being operable from the seat of the driver of the car.

In the accompanying drawings—

Figure 1— is a side elevation partially in section showing an automobile radiator and an associated cover in which my invention is embodied in one form.

Fig. 2— is a broken front elevation thereof.

Fig. 3— is an enlarged, broken perspective of the shutter and

Figs. 4, 5, 6 and 7 show various means by which the shutter may be actuated and adjustably positioned.

It is a well recognized fact that automobile radiators require protection in winter time to prevent chilling of the engine and various devices for this purpose have been heretofore devised. The present invention relates to radiator covers for this purpose and embodies certain improvements in simplicity of construction and ease of adjustment.

Referring to Figs. 1 to 3, the radiator 10 is situated as usual at the front of the hood 11 which covers the engine diagrammatically indicated at 12 and lying in front of the dash 13. The front of the radiator presents the usual grid 14 which under normal conditions is completely exposed to the cooling effect of the air. In order to shield this grid from cold, I have provided a collapsible bellows-like shutter 15 arranged vertically in front of the radiator. While this shutter may be built directly into the radiator casing, I have shown it carried by an auxiliary frame comprising side channels 16 and 17 and a top piece 18 which may be secured to the front of the radiator in any suitable way. Guide rods 19 and 20 extend between the top piece 18 and the bottom of the side channels. On these guide rods slide guide eyes 21 secured in any suitable way to the ends of alternate leaves of the zigzag folded shutter. To the opposite ends of the top piece of the shutter are secured pull cords 22 which are passed upward through guide tubes 23 and united to a common lead 24 beyond the end of the guide tube 32. If desired, the cords 22 may be united at this point by a clamp 25, to insure their exact correspondence in length and the maintenance of the shutter leaves in horizontal position at all times. The lead 24 is carried back toward the dash through guides 26 which may be mounted on a rod 27 extending from the radiator to the dash.

The collapsible shutter 15 may be formed in various ways. Thus it may comprise a series of jointed metal leaves, or fabric covered metal pieces, or as here shown a zigzag folded sheet of flexible material such as pantasote, the margins of which are guarded against wear and fraying by sheet metal clips 28 between which and the fabric may be interposed filler blocks 29 of any suitable material. The guide eyes 21 are secured to these marginal guards. In certain constructions the leaves may be of sufficient weight to collapse the shutter by gravity, but in a fabric construction such as indicated in the drawing, it is desirable to furnish the top leaf with a block 30 extending across the shutter and of sufficient weight to collapse the shutter automatically when the adjusting lead 24 is released. The cords 22 are here shown passing through holes in this weight block 30 and engaged beneath the same by knots 31, or other suitable abutment device.

The means for actuating the shutter from the dash may be variously constructed and I have shown several different types. Thus in Fig. 4 I have shown the lead 24 attached to a strap 32 passing through a horizontal slot 33 in the dash and carrying a pull ring 34 by which the driver may draw the strap through the slot to lift the shutter. The strap 32 is perforated at intervals 35 to receive a locking pin 36 secured to the end of a chain 37 attached to the plate 38 in which the slot 33 is formed. Obviously by pulling the strap through the slot, the shutter may be raised to the extent desired and held in adjusted position by the insertion of the pin 36 in one of the holes 35. On release of the strap, the shutter collapses, pulling the strap in opposite direction through the slot.

In Fig. 5, I have shown the lead 24 passed around a pulley 39 mounted on the engine side of the dash and engaged upon a drum 40. On the axis of the drum 40, but on the driver's side of the dash 13, is mounted a crank 41 by which the drum may be wound, while a ratchet 42 on the drum spindle engaged by pawl 43, provides means for holding the drum after the shutter has been adjusted.

In Fig. 6, I have shown the lead 24 attached to the end of a lever 44 pivoted at 45 on a bracket 46 mounted on the engine side of the dash. A link 47, pivoted at 48 to the lever 44, passes through the dash and is provided with an operating knob 49 to be grasped by the driver. On one edge the link 47 is serrated at 50, and the teeth coöperate with a pawl 51 formed in the foot of the bracket 46 to hold the lever in adjusted position.

In Fig. 7, I have shown the lead 24 provided with a series of spaced knobs or balls 52 and terminating in a ball grip 53. A bayonet slot plate 54, through which the lead passes to the driver's side of the dash, permits the balls 52 to pass through the large opening 55 therein, while the slot 56 opening thereto receives the lead 24 but is of such width that the balls 52 cannot pass therethrough.

It is obvious that in an automobile of this type the shutter may be permitted to remain closed when the car is started and it can be opened by the driver from his seat while the car is under way and after the engine has thoroughly warmed up. The extent of the opening may be readily adjusted to the temperature conditions of the air. While, as stated, the shutter may be built into the radiator housing, it may with equal facility be manufactured as an independent unit and applied to the radiator housing in the manner shown. The device has the further merit of simplicity and efficiency combined with economy of construction.

Various modifications in the detail of construction will readily occur to those skilled in the art without departing from what I claim as my invention.

I claim—

A radiator closure device for automobiles, comprising a frame adapted to fit around the radiator opening, and comprising lateral guide-ways, a collapsible bellows-like curtain positioned in collapsed condition at the bottom of the radiator opening, a weight bar arranged at the upper margin of the curtain to insure its collapse by gravity, guide means at the side of said curtain running in the lateral guide-ways of the frame, flexible lifting strands attached to the side margins at the top of the curtain for raising and lowering the latter, said strands lying within the lateral guide-ways of the frame, and means operable from the driver's seat for operating said strands to lift or lower the curtain in front of the radiator opening.

In testimony whereof I have signed my name to this specification.

EUGENE R. MERTENS.